Feb. 1, 1955        K. V. HART        2,701,290
APPARATUS FOR ELECTRIC WELDING
Filed June 6, 1950        5 Sheets-Sheet 1
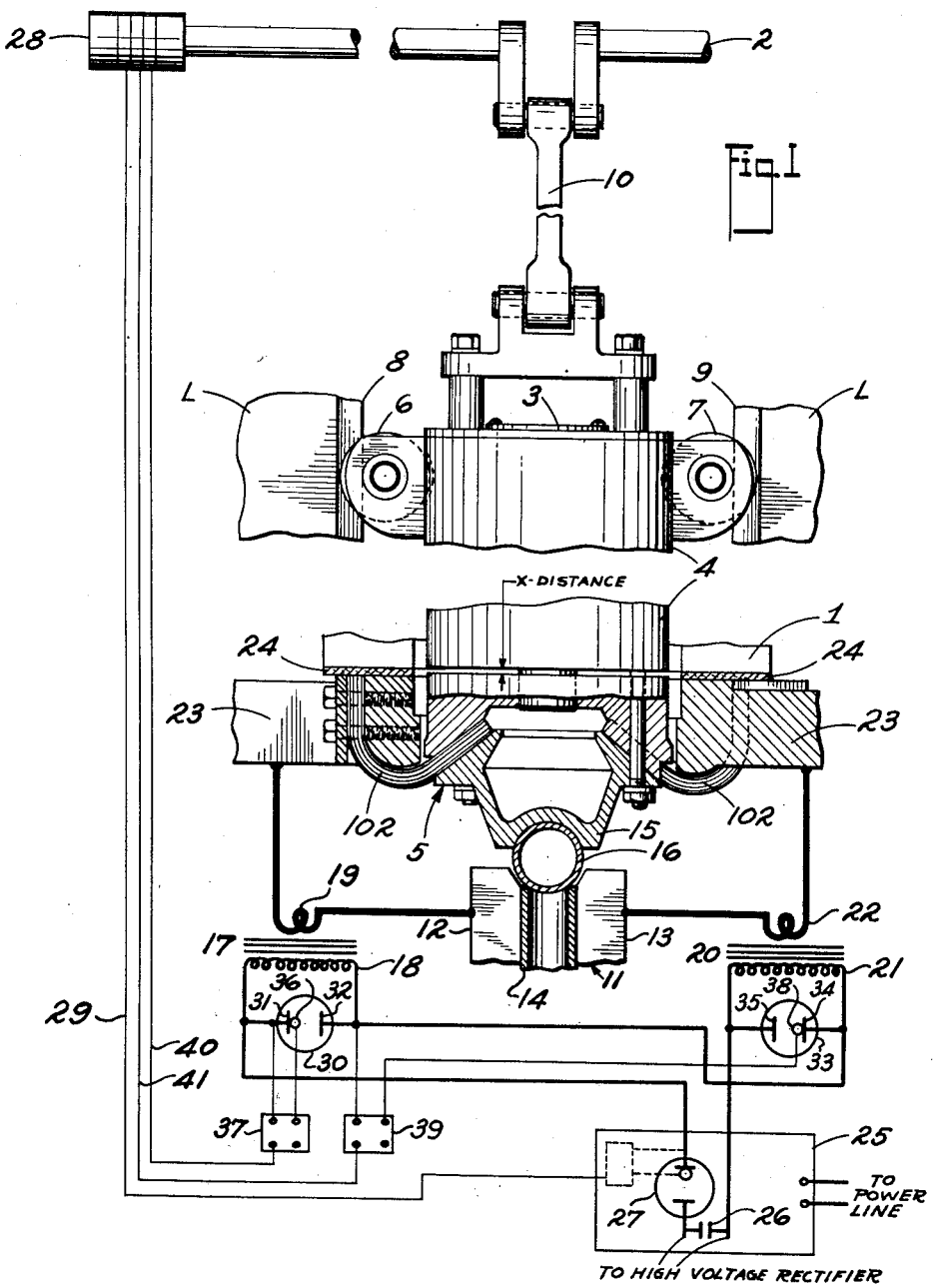
INVENTOR.
KENNETH V. HART
BY
*Richey & Watts*
ATTORNEYS

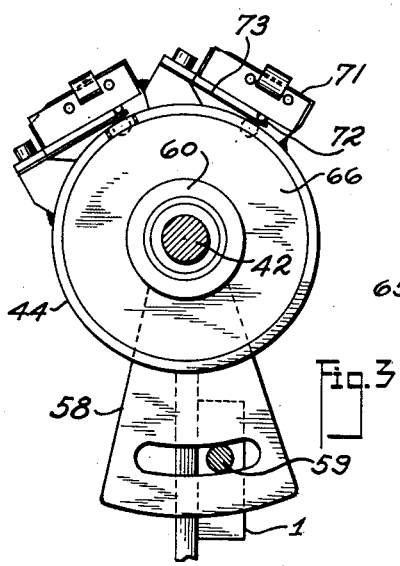
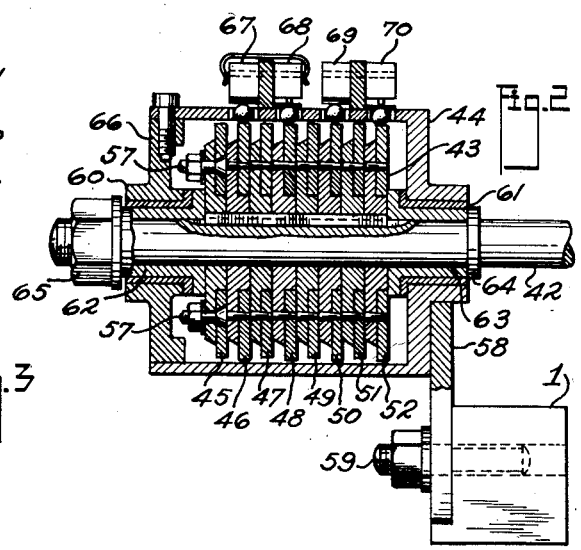
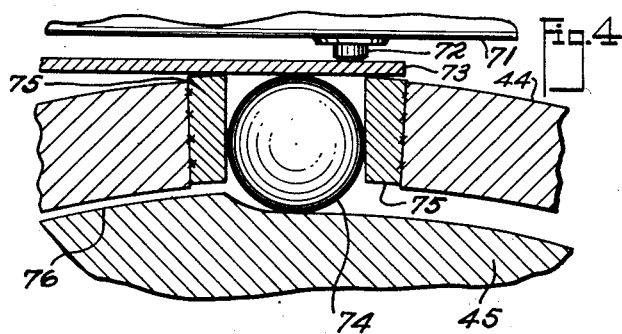
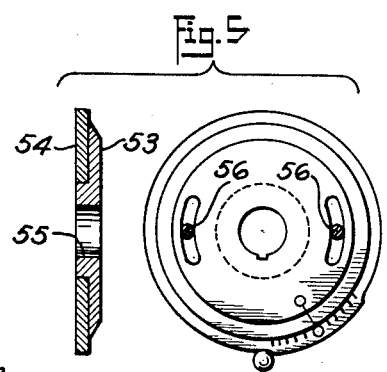
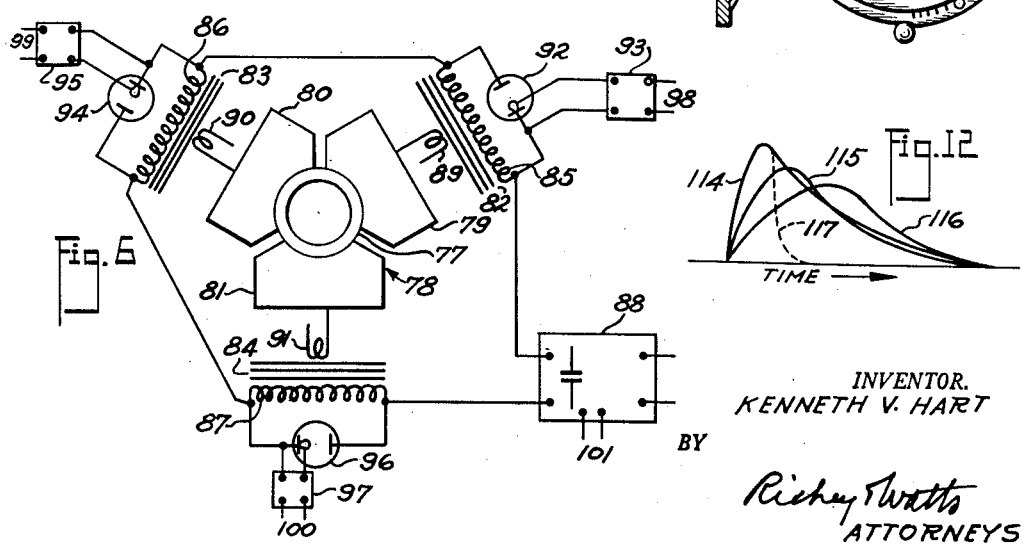
INVENTOR.
KENNETH V. HART

Feb. 1, 1955 K. V. HART 2,701,290
APPARATUS FOR ELECTRIC WELDING
Filed June 6, 1950 5 Sheets-Sheet 3
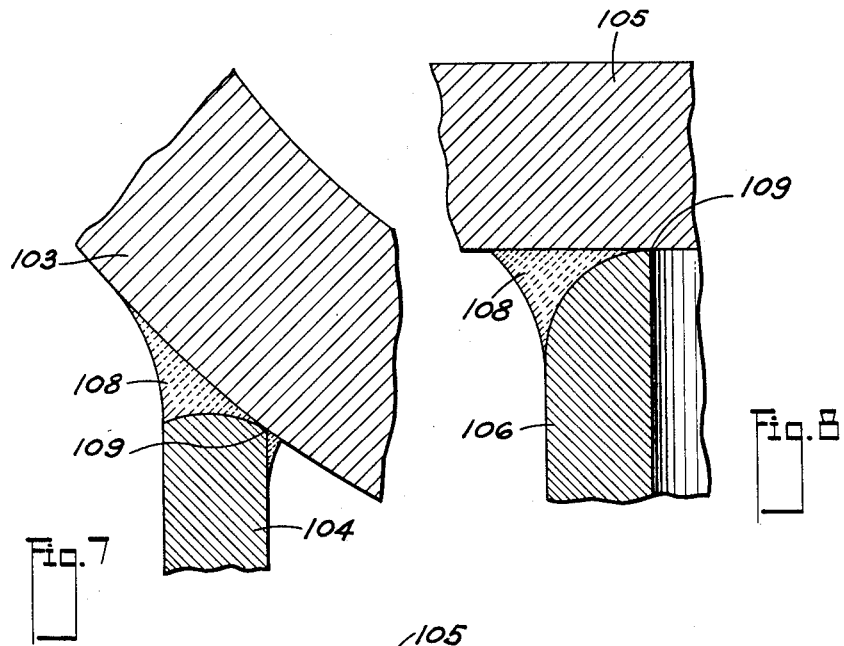
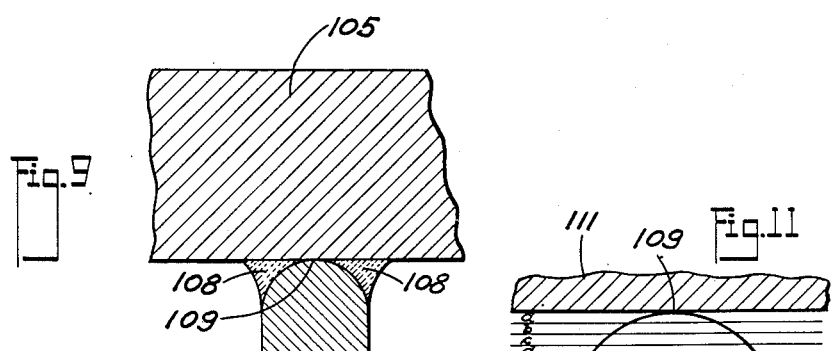
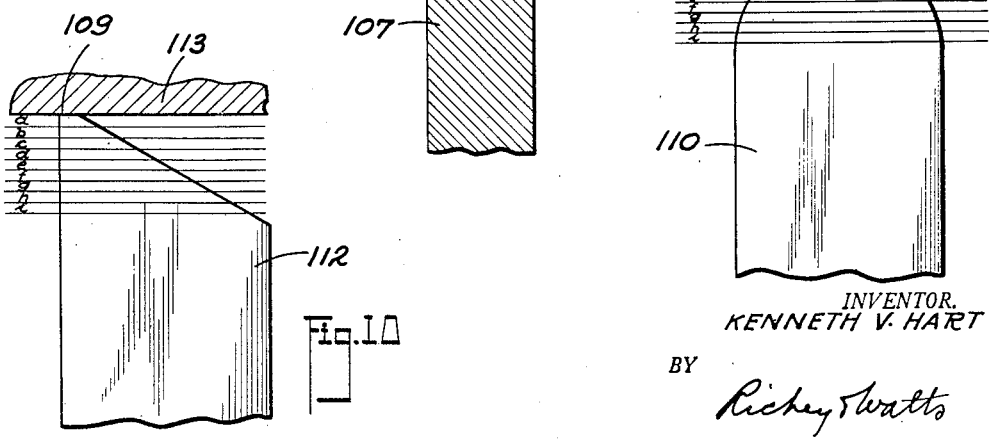
INVENTOR.
KENNETH V. HART
BY
Richey & Watts
ATTORNEYS

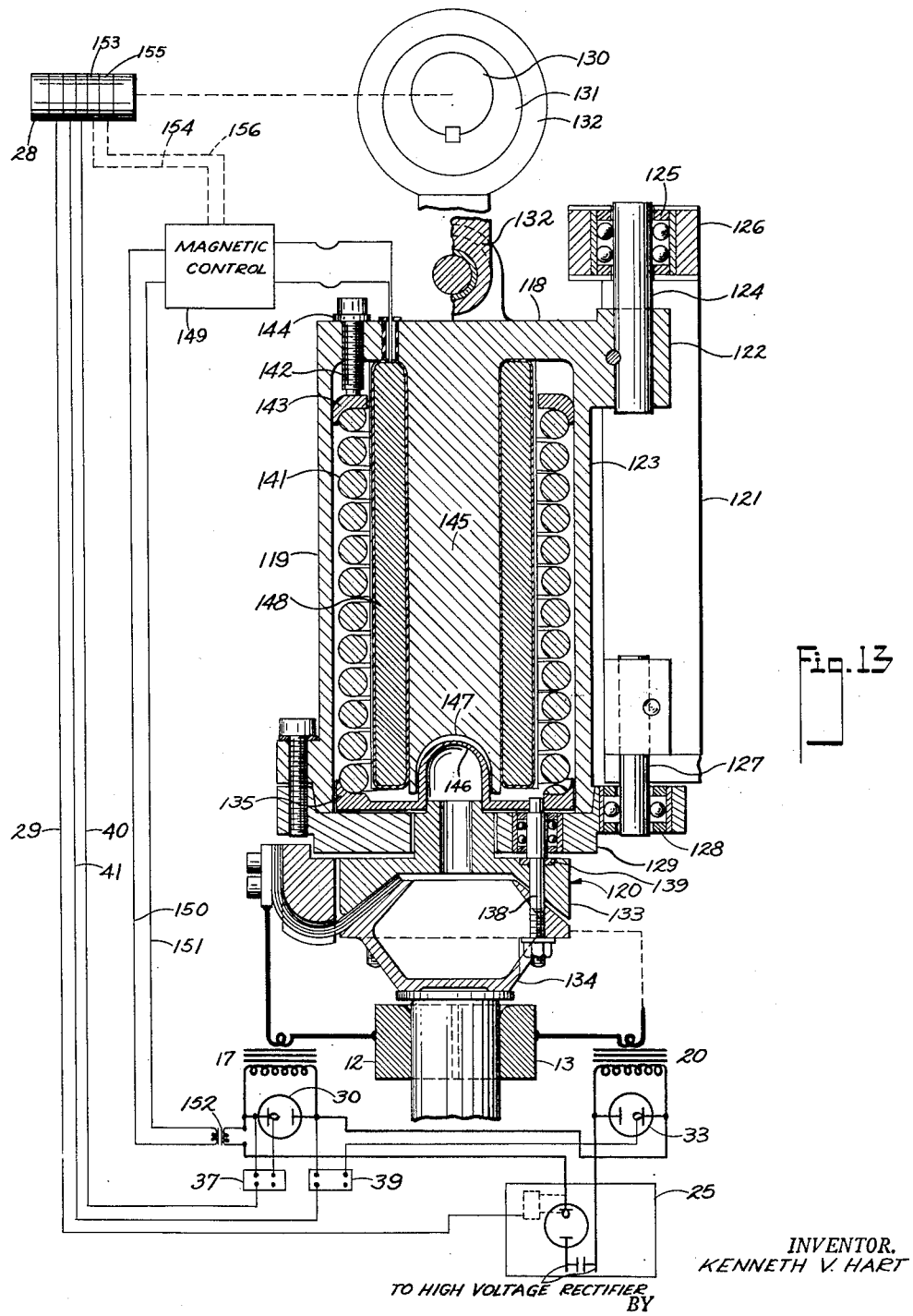

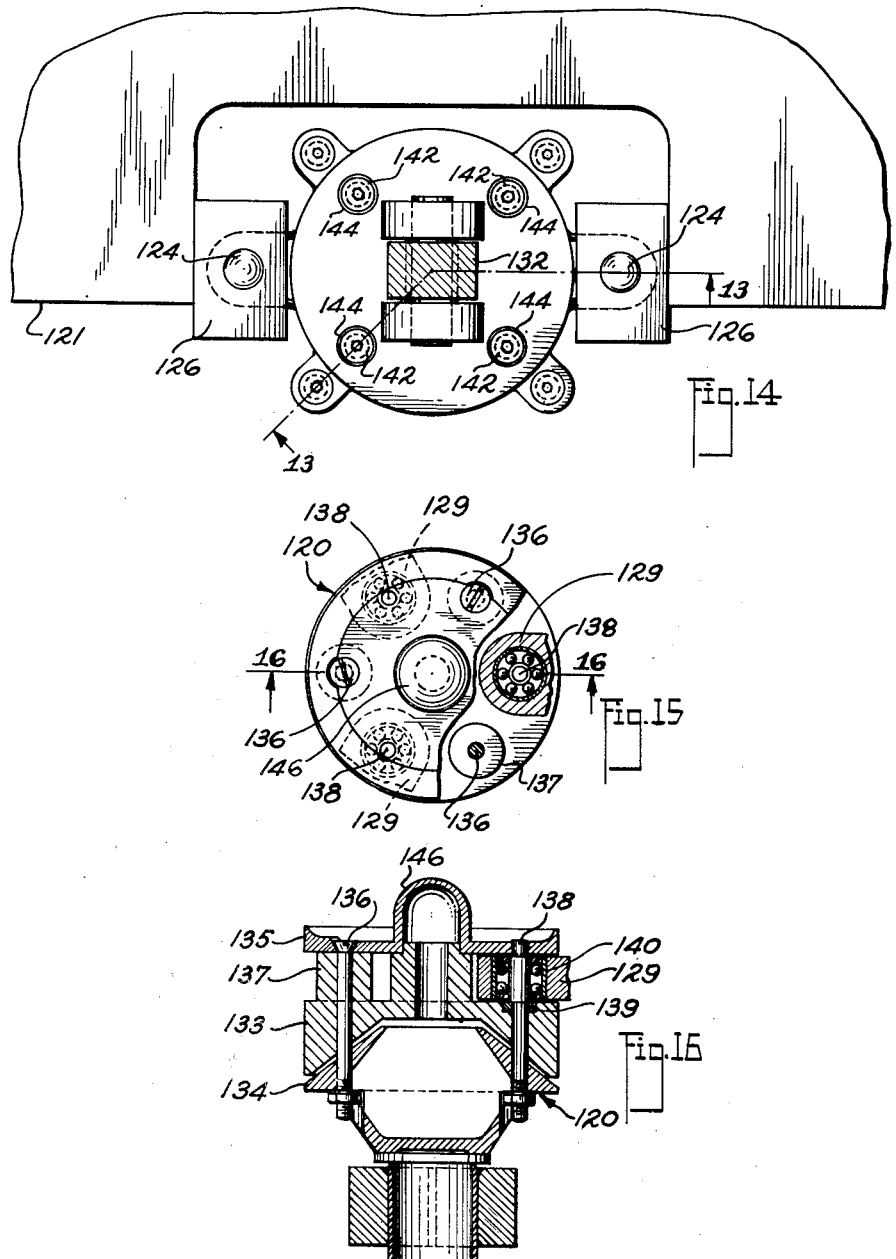

United States Patent Office 2,701,290
Patented Feb. 1, 1955

2,701,290

APPARATUS FOR ELECTRIC WELDING

Kenneth V. Hart, Cleveland, Ohio

Application June 6, 1950, Serial No. 166,306

34 Claims. (Cl. 219—4)

This invention relates generally to electric welding and, more particularly, to methods of and apparatus for forming an electric resistance surface weld between the end of a tubular metal piece and the surface of another metal piece.

In U. S. Patent No. 2,091,982 there is disclosed a method of making an "electric resistance surface weld" together with certain apparatus which may be used to carry out the method claimed in that patent. In that apparatus, the pieces to be joined by the weld are positioned between a lower fixed electrode and an upper movable electrode, the welding energy being supplied to the electrodes from the secondary of a single welding transformer. The apparatus includes means for moving the upper electrode toward the lower electrode to initiate the welding operation, and a yieldable mechanism or "reciprocable pressure-head" to cause the movable electrode to force the upper piece toward the lower piece when the metal of those pieces softens and becomes deformable; that is, the pressure-head causes the upper electrode to "follow-up" or move the upper piece toward the lower piece when the metal of the engaging portions of the two pieces reaches a welding condition. An exemplary embodiment of the invention of this patent utilizes alternating current energy in the formation of a weld in low carbon steel; that is, a material having a relatively wide plastic range. U. S. Patent No. 2,417,075 discloses improved apparatus, particularly an improved pressure-head and improved electrodes, for making the electric resistance surface welds of the above referenced patent and the welds of certain related patents, particularly U. S. Patents No. 2,183,563 and 2,425,470.

The formation of the novel weld or welded joint of the above referenced patents involves the use of a wedge-shaped space and an initial narrow continuous line contact between the surface at the end of a tubular piece and the surface of the opposed piece; the rapid heating of the metal progressively from the line of contact by the welding current; the application of welding pressure and the application of a follow-up pressure. The end of the tubular piece is beveled to provide the line contact and the wedge-shaped space. When the line contact is to be at the inner edge of the article, the end surface is inclined to that surface at such an angle as would define with the opposed surface a wedge-shaped space, or clearance angle, of the side desired. The size of this clearance angle depends upon the metal of the pieces, the depth of penetration of the weld, the size of the fillet, and the shape of the opposed surface, that is whether it is flat or contoured.

In the practice of the invention disclosed and referenced above, certain difficulties arise. A continuous line contact is essential, and in preparing the adjoining portions of the surfaces of the pieces to be welded, precision machine work is required. A further problem is presented in that the clearance angle between the pieces adjacent the line contact determines the rate of heating during the application of welding current. Under certain conditions such as where tubular pieces are joined at an acute angle or with offset axes, the wide variation in the amount of metal back of the line contact, prevents the formation of welds of satisfactory quality even though the machining of the parts is quite accurate. These difficulties have been recognized, and apparatus useful in diminishing their importance is disclosed in U. S. Patent No. 2,455,057 wherein multiple electrodes are positioned about the circumference of one of the pieces to be welded to insure proper distribution of welding current.

The present invention is concerned with means whereby the above described difficulties in producing electric resistance surface welds may be further greatly reduced and the field of application of such welds greatly widened. The invention is conceived with respect to a novel apparatus for performing the welding operation, a novel welding zone produced by appropriate contouring of the pieces to be welded, and a novel method of accomplishing the welding operation. The apparatus of the invention, as herein set forth, functions particularly with respect to the control of unidirectional impulses of welding current and the correlation of the waveform and amplitude of the impulses with respect to the pressure cycle of the welding press and to the structure and form of the pieces to be welded. As such, the apparatus includes a welding press and a variable pressure-head, both of the same general character as employed in the patents just referred to. A plurality of transformers are connected between a single movable electrode mounted in the pressure-head and a plurality of electrodes spaced about one of the pieces to be welded. The primaries of the transformers are connected in series and unidirectional impulses of energy supplied to the transformers by a stored energy supply such as a capacitor-rectifier system. A timer connected to the drive shaft of the press serves to control the action of the energy supply and synchronizes the impulsive flow of currents to the welding electrodes with the mechanical action of the pressure-head. Further, the timer serves to control the action of gaseous discharge devices connected across the primaries of the welding transformers and acting as low impedance shunt devices so that the duration of the impulse of welding current may be controlled within predetermined limits. As a further development of the apparatus of the invention, a novel electromagnetic pressure-head is utilized to provide an ancillary control of the variable pressure device of the pressure-head.

The novel welding zone of the invention is formed by contouring the adjacent portions of the pieces to be welded so that the space between the pieces diverges from an initial line contact. The divergent welding zone thus formed is designed so that the area of the layer of fused metal on the surface of the upper or end piece increases rapidly immediately after initial formation of a thin layer of surface fused metal on the end-piece with a thin layer of fused metal at the line of contact between the pieces, that is "peripheral contact." The continuation of the fusion process then proceeds at a rate determined by the further shape of the welding zone and the pressure of the welding press so that the current density requirements of the fusion process may be properly correlated with the waveform of the impulse of welding current. The novel method of the invention resides in the manner of formation of the welded joint, as independent of the specific apparatus here disclosed.

An object of the invention is the alleviation of oxidation effects in electric resistance surface welding systems.

An object of the invention is the welding of material having a sharp fusion point and a narrow plastic range such as the alloys of aluminum and magnesium and the high tensile strength steels.

Another object of the invention is the welding of alloys composed of elements having different melting points.

An object of the invention is the precise control of the flow of welding currents in pressure welding systems.

A further object of the invention is the control of welding current waveforms in electric resistance surface welds.

A further object of the invention is the control of the flow of individual welding currents in welding systems utilizing multiple work-holding electrodes.

A still further object of the invention is to provide a welding system in which the flow of welding energy is related to the pressure between the work pieces.

Still another object of the invention is the synchronization of variations in welding currents with variations in welding pressures in electric resistance surface welders.

It is a feature of the invention that the desired width of plastic metal is formed between a tubular-shaped piece and an end piece at an extremely high rate during the interval of increase of amplitude of a single impulse welding current.

It is a feature of the invention that a circumferential line contact pressure, a peripheral contact pressure, a follow-up pressure, a metal setting pressure and a forging pressure are correlated and timed to form a welding cycle.

It is a feature of the invention that a high rate of generation of heat due to a substantial increase of resistance is initiated subsequent to the formation of a peripheral contact between the work pieces.

It is a feature of the invention that a follow-up pressure is applied subsequent to the formation of a peripheral contact between the work pieces.

It is a feature of the invention that a metal setting pressure which presses the plastic metal into conformity with the die is applied subsequent to the follow-up pressure.

It is a feature of the invention that a high toggle pressure is utilized to accomplish a mechanical deformation of the metal from the plastic to the solid state subsequent to the metal setting action.

It is a feature of the invention that the impulse of welding current may be terminated at any time after the maximum amplitude is passed.

It is a feature of the invention that the variation in welding current amplitude is related to the variation in volume of metal to be fused.

It is a feature of the invention that the design and adjustment of the apparatus may be varied to accommodate the energy levels of various kinds of metals to be welded.

These and other objects and features of the invention will be more readily apparent from a consideration of the following detailed specification and appended claims, taken in connection with the accompanying drawings, in which:

Fig. 1 shows a schematic diagram of the circuits of the invention in conjunction with a welding press, the latter shown partly in outline and partly in section;

Fig. 2 is an enlarged sectional view of the timer of Fig. 1;

Fig. 3 is an end view of the timer;

Fig. 4 is an enlarged view of a portion of the timer, showing particularly the manner of actuation of a switch thereof;

Fig. 5 shows a composite cam of the timer in detail;

Fig. 6 illustrates an embodiment of the invention incorporating a multiple clamping die;

Figs. 7, 8, and 9 illustrate various forms of the divergent welding zone of the invention;

Figs. 10 and 11 provide an illustrative comparison of the wedge-shaped welding zone with the divergent welding zone of the invention;

Fig. 12 is illustrative of several waveforms of the welding current impulse;

Fig. 13 illustrates an embodiment of the invention incorporating an electromagnetically controlled variable pressure device;

Fig. 14 is a top view of the pressure-head of Fig. 13;

Fig. 15 is a view, partially in section and partially in cutaway of the inner slide of the pressure device of Fig. 13; and Fig. 16 is a further sectional view of the inner slide of the pressure device of Fig. 13.

Referring now to Fig. 1, the apparatus shown comprises a portion of a welding press including a frame 1, a crank shaft 2, and a pressure-head 3. The pressure-head 3 may be of a type having relatively reciprocable portions such as is described in detail in the above referenced patents and particularly in U. S. Patent No. 2,455,057. As here shown, the pressure-head 3 comprises an outer slide or body 4 and an inner slide 5 and includes a pressure member such as a spring connected between the two slides to permit relative motion upon the application of sufficient pressure. The inner slide 5 must be of light weight construction in order to effectuate the exceptionally high speed operation of the present apparatus. The pressure-head is mounted for reciprocation as a unit by means of grooved rollers 6 and 7 which engage guide ways 8 and 9 supported by the frame 1. The crank shaft 2 is connected to a source of motive power, and motion is imparted to the head by a connecting rod 10. The actuation of the crank shaft 2 is, of course, under the control of the operator.

A fixed or clamping die 11 which may comprise two similar parts 12 and 13 is mounted on the frame 1, and serves to support a piece 14 to be welded. A movable die 15 is mounted as a part of the inner slide 5 of the pressure-head 3 and serves to force an end-piece 16 into pressed engagement with a butt-piece 14 during the welding operation. At such time, the dies 11 and 15 serve also as electrodes for conducting the welding current to the work pieces, that term being used interchangeably with the word "die" herein.

Welding current is supplied from a first welding transformer 17 having a primary 18 and a secondary 19 and a second welding transformer 20 having a primary 21 and a secondary 22. The secondary windings are effectively connected in parallel across the welding load in order that the proper amounts of welding current may be supplied to the portions of the pieces to be welded. As shown, one terminal of the secondary 19 of the first welding transformer is connected to a part 12 of the clamping die, while a terminal of the secondary 22 of the second welding transformer is connected with the remaining part 13 of the clamping die. The remaining terminals of the secondaries of the welding transformers are connected to a conductor 23 which is supported by the frame 1 and insulated therefrom by an insulator 24. The conductor 23 is electrically joined to the movable die 15 by means of a plurality of flexible conductors 102 so that the secondaries of the transformers are effectively connected between the movable or pressing die and the parts of the fixed die. The design and organization of the electrodes and connections is an important aspect in the practice of the invention and the considerations appertaining thereto are set forth in detail in the previously referenced patents. The welding transformers are of a non-saturating type, well known in the art, or may have means (not shown) associated therewith for preventing saturation effects. Finally, the transformer turns ratios, that is, impedance ratios, must be determined specifically with respect to the rate of increase of welding current, the manner of divergence of the welding zone from the line contact, and the desired division of welding currents among multiple welding electrodes.

The primaries 18 and 21 of the welding transformers are connected in series and are energized by an energy supply 25. The energy supply 25 is of a storage type, and capable of producing unidirectional impulses of current and potential at spaced intervals of time. As represented in Fig. 1, the energy supply may be of a capacitor storage type in which the energy is stored primarily in an electric field, having a storage capacitor 26 which is charged by a transformer-rectifier system. Discharge of the capacitor 26 is effected by a gaseous discharge device 27 which, upon appropriate excitation, becomes conducting and allows the electrical energy stored in the capacitor to flow into the primaries of the welding transformers. When the capacitor 26 is discharged to a certain level, the discharge device 27 becomes non-conducting and the capacitor is recharged. Other types of supplies, capable of supplying energy impulses of the required waveform and controllable by signalling impulses of low energy content may be utilized within the spirit of the invention. Magnetic storage supplies, that is, supplies in which the energy is stored primarily in a magnetic field, may be utilized within the spirit of the invention.

The action of the stored energy supply is controlled and synthronized with the action of the welding press by means of a timer 28 connected to the crankshaft 2. The construction of the timer will be described in detail below. For the purposes of the present discussion, it may suffice to say that the timer comprises a series of cam operated switches, the operation of the switches being predetermined as to time, duration and relative phase with respect to the rotational position of the crankshaft. A switch of the timer 28 is connected to the energy source 25 via a conductor 29. Appropriate circuits shown in outline for the control of the gaseous discharge device 27 are included in the stored energy supply 25 so that, upon closure of the above-mentioned switch, the discharge device becomes conducting. Thus, the initiation of discharge of the capacitor 26 is related to the rotational position of the crankshaft, and, in operation, to the cocking of the inner slide with respect to the outer slide of the pressure-head.

The timer 28 serves also to control the action of low-impedance shunt devices in the primary circuits of the welding transformers. A gaseous discharge device 30 having a cathode 31 and an anode 32 is connected across the primary 18 of the first welding transformer while a second similar gaseous discharge device 33 having a cathode 34 and an anode 35 is connected across the primary 21 of the second welding transformer. These gaseous discharge devices may be of a controlled ignition type, such as ignitrons, shown here in illustrative representation, or of a grid controlled type known in the art as thyratrons. Initiation of a conductive discharge in the first shunt device 30 is controlled by an igniter electrode 36 which is excited by an ignition impulse from an ignition control circuit 37. Similarly, the second shunt device 33 includes an igniter electrode 38 which is connected to an ignition control circuit 39. The ignition control circuits 37 and 39 are connected to switches of the timer 28 by conductors 40 and 41 respectively, the entire arrangement being such that closure of a timer switch supplies an ignition impulse to the corresponding ignition electrode. Thus, the action of the shunt devices is under positive control and related to the rotational position of the crankshaft.

Referring now to Figs. 2, 3, 4, and 5, the organization and construction of the timer 28 is therein set forth in various views. As shown particularly in Figs. 2 and 3, the timer is composed of a rotary portion including a shaft 42 and a cam assembly 43 and a fixed portion including a frame 44 and a series of switches, of which only a part is shown. The cam assembly 43, which is rigidly mounted upon the shaft 42, comprises a series of composite cams 45, 46, 47, 48, 49, 50, 51, and 52. As is shown in Fig. 5, each composite cam includes an inner or hub portion 53 and an outer or cam portion 54. Each hub portion 53 is bored for a press fit upon the shaft 42 and includes a keyway 55 so that the entire group of cams may be keyed to the shaft. The cam surface is formed on the periphery of the cam portion 54 which is mounted upon the hub portion relative to the hub portion of the composite cam is afforded by pins 56, such adjustment being normally determinable prior to assembly of the timer. The end cam 45 is provided with adjusting screws 57 whereby that cam may be adjusted relative to the rest of the cams of the group.

The frame 44 of the timer is mounted upon the frame 1 of the welding press by means of an adjusting arm 58 and a stud 59. Mutual support between the shaft 42 and the frame 44 is provided by a pair of bearings 60 and 61 cooperating with a pair of bushings 62 and 63. The bushings 62 and 63 with a collar 64 and a nut 65 serve to provide precise longitudinal positioning of the cam assembly 43 and frame 44 along the shaft. A removable end plate 66 provides access to the cam assembly.

The timer frame 44 serves to support a series of switches, each switch being associated with an appropriate cam. Thus, of the switches shown in Figs. 2 and 3, 67, 68, 69, and 70 are operated by cams 46, 48, 50, and 52 respectively, while switch 71 is operated by cam 45. The switches are of a snap-action type, well known in the electrical arts, and are capable of making or breaking a circuit in a time duration of the order of microseconds. The manner in which the switches are operated by the cams is shown in detail particularly in the enlarged view of Fig. 4. As there shown, the switch 71 includes a plunger 72 which bears upon a leaf spring 73 supported by the timer frame 44. A ball 74 engages the surface of the cam 45 and is constrained by bearing plates 75 in the frame. The plunger 72 is spring actuated and, with the leaf spring 73 serves to keep the ball 74 in firm engagement with the surface of the cam as the latter rotates. The angular extent of the raised surface 76 of the cam 45 must, of course, be determined with respect to the characteristics of the particular welding system.

The switch 71 of the timer 28 is utilized to control the action of the stored energy supply 25 (Fig. 1) and is connected through the conductor 29 to the appropriate ignition control circuits included therein. Similarly, two of the remaining switches, such as 67 and 68 are connected via conductors 40 and 41 to the ignition control circuits 37 and 39. The ignition control circuits, in every case, serve to initiate a conductive discharge in the associated discharge device upon closure of the switch contacts and adjustment of the cams relative to the crankshaft may be with respect to the closure position. The adjusting arm 58 which must be designed for very precise adjustment of time of switch operation, serves to relate the flow of welding current to the position of the pressure-head 3, while the adjustment of cam 45 relative to the remainder of the cam assembly serves, in effect, to determine the waveform of the welding current.

Referring now to Fig. 6, there is shown, in schematic diagram, an embodiment of the invention useful particularly in applications, requiring a clamping die having more than two parts. The situations imposing such requirements have been noted herein and further reference may be made to U. S. Patent No. 2,455,057, wherein the problem is set forth in detail. The arrangement is intended to be illustrative of the application of the principles of the invention and the following description is to be understood in that light. The apparatus of Fig. 6 includes a tubular work piece 77 and a clamping die 78 having three parts 79, 80, and 81. The welding transformers 82, 83, and 84 have primaries 85, 86, and 87, respectively, in serial connection with a stored energy supply 88 which may be of the same type as the supply 25 of Fig. 1. The secondaries 89, 90, and 91 of the welding transformers have terminals connected to the three parts 79, 80, and 81, respectively of the clamping die 78, while the remaining terminals of the secondary windings are connected to the movable die (not shown) after the fashion of Fig. 1. Low impedance shunts are provided by a gaseous discharge device 92 and associated control circuit 93 connected across the primary 85; a discharge device 94 and associated ignition control circuit 95 connected across primary 86; and a discharge device 96 and associated ignition control circuit 97 connected across the primary 87. The ignition control circuits and the supply are connected to a timer by means of connections 98, 99, 100, and 101, respectively in a manner similar to the arrangement of Fig. 1, in order that the operation of these circuits may be related to the rotational position of the crankshaft of the welding press.

Referring now to Figs. 7 to 9, and 11, there are shown several forms of the divergent welding zone of the invention. Fig. 7 illustrates one form of the welding zone useful in the formation of a joint between a tubular end piece 103 and a tubular butt piece 104 while Figs. 8 and 9 are similarly illustrative for a plate end piece 105 and tubular butt pieces 106 and 107 respectively. The form of the welding zone is indicated by the solid outlines of the structure of the pieces prior to the welding operation while the filled-out portions 108 indicate the added space occupied by weld metal at the completion of the weld.

In each structure, the separation of the metal of the pieces forms the welding zone, which may be considered as diverging from an initial line contact 109. The welding zone may diverge in accordance with a suitable predetermined function of the distance from the line of contact and in a single (as in Figs. 7 and 8) or both (as in Fig. 9) radial directions therefrom. The exact geometric shape of the structures is determined so that the divergent welding zone effects a correlation between the variation of the electrical and mechanical resistance of the joint as the weld progresses and the variation in amplitude of the welding current waveform. Welding zones formed by either circular or elliptical cross sections at the end of the butt-piece have been found suitable in certain applications of the invention.

The significance of the manner of divergence of the welding zone of the invention will be more readily understood by a consideration of Figs. 10 and 11 wherein equispaced sections designated by letters *a* to *i* are shown for wedge-shaped space extending in a single radial direction from the line of contact (Fig. 10) and for an essentially circular divergence in both radial directions from an initial line of contact (Fig. 11). Two effects are important. First, it will be seen that, proceeding from the line contact 109, the initial rate of change of separation between the butt-piece 110 and the end piece 111 of Fig. 11 is much smaller than between the butt-piece 112 and end-piece 113 of Fig. 10 where the rate of change of separation is constant. This fact results, during the welding operation, in a rapid initial formation of a thin layer of fused metal upon the surface of the end-piece 111, after the first formation of layer of fused metal between the pieces at the line contact 109. The rapid initial formation of such a surface layer then permits the proper continuation of the fusion process into the butt-piece 110 and an optimum formation of the nucleus of the weld. The manner of formation of this nucleus determines the strength of the weld, the criteria varying with the type of metals to be welded.

The second effect is concerned with the manner of variation of the volume of metal at the end of the work piece. A comparison of the area between the sections of Figs. 10 and 11 will indicate that the change in volume of metal of the butt-piece increases at a greater rate for the first few sections and increases at a lesser rate for the last few sections for the welding zone of Fig. 11 as compared with the welding zone of Fig. 10. Since the current requirements for the fusion process correspond to the volume of metal to be fused, it will be seen that the variation of the flow of energy from the storage source may be synchronized with the current requirements as the two pieces move together in the fusion process. Since the welding zone illustrated in Fig. 10 is that of the patents previously referred to, the distinction between the mode of practice of that invention and the present invention will be apparent to those skilled in the art.

In operation, the articles to be welded are inserted in the press, the butt-piece of the joint being held by the clamping die 11 (Fig. 1) and the end-piece positioned under the movable die 15. The end of the butt-piece is, of course, machined so that the end surfaces of that piece and the outer surface of the wall of the end piece form a circumferential line contact and an appropriate clearance contour radially from the line of contact, as has been previously discussed. Upon initiation of a welding cycle by the press operator, the rotation of the crankshaft 2 moves the pressure-head 3 downward along the guide ways 8 and 9. As the movable die 15 engages the work piece 16, it centers and aligns the piece into proper position and the relative pressure between the two pieces increases rapidly. This pressure establishes a firm line contact between the surfaces of the two pieces and between the movable die 15 and the end-piece 16 to form an electric current path therethrough. Concurrent with this action, however, the further travel of the movable die 15 brought about by the engagement of the work pieces 14 and 16 causes the actuation of the pressure-head 3, that is, the outer slide 4 of the pressure-head moves relative to the inner slide 5, thus causing the pressure device incorporated therein to become cocked or compressed. As the pressure reaches a predetermined value, that is, when the distance between the outer slide 4 and inner slide 5 denoted as "X" distance in Fig. 1 has decreased to a critical distance, the timer, which is adjusted relative to the position of the crankshaft for this pressure and slide separation, initiates the flow of current from the energy source 25 by causing the firing of the gaseous discharge device 27. The storage capacitor 26, which has previously been charged, then begins to discharge into the primaries of the welding transformers 17 and 20. It is to be emphasized that the value of the X-distance for which the energy source is activated is extremely important in that the proper formation of the peripheral contact between the work pieces is determined thereby. Consequently, a critical adjustment of the arm 58 of the timer is essential.

The flow of current into the primaries 18 and 21 of the welding transformers produces increasing magnetic fields and the consequent generation of electric potentials across the secondaries 19 and 22. Since the work pieces 14 and 16 are in conductive engagement at this time, welding currents of rapidly increasing magnitude flow in the loop formed by the secondary 19, conductor 23, flexible conductors 102, the movable electrode 15, work pieces 16 and 14, and the part 12 of the fixed die 11 and the second similar loop which includes the secondary 22 and the part 13 of the fixed die.

The flow of energy from the storage capacitor 17 and 20 is, in general, exponential in character, as will be apparent from a theoretical consideration of the circuit of the invention. Fig. 12 is an oscillographic representation of the manner of variation of the welding currents the three waveforms 114, 115, and 116 corresponding to various relationships between the circuit parameters such as transformer impedances. It will be seen that the initial rate of increase of current magnitude is relatively high and, as this current flow is through the initial circumferential line contact between the work pieces, a rapid increase in the electrical resistance takes place as the metal begins to heat. The heating process takes place at an increasing rate corresponding to the increase of resistance so that a thin layer of fused metal is formed on the contacting surfaces of the pieces. This contact between the pieces at this stage of the process may be termed a "peripheral contact." Once the peripheral contact is formed, the initial low value of the divergence of the welding zone together with the continued relatively high rate of increase of welding current leads to a rapid increase in the area of fused metal at the surfaces of the two parts, as has previously been discussed.

As the area of fused contact increases to a certain critical extent, the pressure upon the pieces increases rapidly to prevent "blow-out." This action is accomplished both by the variable pressure-head, which exerts a follow-up pressure as the fusion process proceeds, and by the continued rotation of the crankshaft which is, at this time, still moving toward the bottom of the stroke. As the maximum amplitude of the welding current impulse is reached, a metal setting pressure is applied by the further rotation of the crankshaft and the further action of the pressure-head which presses the plastic metal of the butt-piece toward conformity with the clamping electrode 11. Then as the pressure-head reaches the bottom point of the stroke, a very high forging pressure is applied to the pieces by the toggle action of the crankshaft, the outer slide and inner slide of the pressure-head being in engagement. Upon completion of the toggle action, the follow-up action of the pressure-head maintains the pressure for a period to allow the grain structure of the weld to form properly.

According to the invention, the shunt devices 30 and 33 are utilized to control the duration of the welding current impulse for a desired period after the impulse reaches the maximum. That is, since the welding current reaches a maximum at about the time that the storage capacitor 26 is effectively discharged and the discharge device 27 becomes non-conducting due to a loss of a discharge maintaining potential, the rate of decrease of the amplitude of the secondary current, that is, the welding current, would normally be dependent upon the welding load. Here, the conduction of the shunt devices may be initiated so as to dissipate the transformer fields at a relatively high rate to produce a waveform generally similar to that shown in dotted outline 117 in Fig. 12. The time of actuation of the shunt devices is largely determined by the character of the materials to be welded, that is whether the heating process must be continued during the setting and forging portions of the welding cycle. In general, materials having relatively wide plastic range, such as the mild steels, will require a longer impulse than the materials having a critical fusion point and relatively narrow plastic range, such as has aluminum and molybdenum, which require that the shunt devices be actuated immediately after the welding current impulse has reached the maximum. Finally, since the timing of the action of each of the shunt devices may be controlled by adjustment of the cams of the timer, the duration of the separate welding current impulses may be varied so as to accommodate variations in the quantity of metal about the circumference of the butt-piece 14.

The circuit of Fig. 6 functions in essentially the same manner as heretofore described with reference to Fig. 1. The employment of such an apparatus is of particular advantage in applications wherein a variation of the radial rate of fusion about the circumference of the butt-piece must be controlled by the use of multiple current loops. In general, a maximum practical number of transformers and corresponding clamping electrodes will be used as determined principally by the physical size of the pieces to be welded. The low impedance shunt devices of the invention are used to determine the value of the heat energy applied to each segment in such applications. Hence, by properly relating the respective transformer secondary impedances and the timing of the activation of the shunt devices, a precise control of the welding current amplitudes and waveforms is obtained.

The variable pressure device 3 of Fig. 1 may, in proper cases, be modified to provide further means for synchronization between the variation in electrode pressures and variation in welding currents and potentials. There is shown in Fig. 13, an embodiment of the apparatus of the invention incorporating a variable pressure device in which electromagnetic control of spring pressure is provided. The electromagnetic forces are utilized to counteract the effective spring pressure so that the circumferential line contact between the work pieces is maintained for a sufficient length of time to permit the initiation of the weld current at a relatively low potential, and to further assist the rapid initial formation of a layer of fused metal on the end piece. At the proper time in the fusion process, the normal spring action may be restored by neutralizing or reversing the effect of the electromagnet.

The electromagnetically controlled variable pressure device is, in general, similar to the variable pressure device of U. S. Patent No. 2,419,075 previously referred to, and the considerations affecting the design of that unit are applicable here. The variable pressure device 118 comprises an outer slide 119 and an inner slide 120, the entire unit being mounted for reciprocative movement upon a frame 121. At the upper end of the slide, a bracket 122 attached to the outer cylindrical shell 123 of the outer slide supports a pin 124 which is constrained by a bearing 125 mounted in an arm 126 of the frame 121. At the lower end of the slide a pin 127 is mounted in the frame to cooperate with a bearing 128 mounted in an extension of the outer slide bottom plate 129. The entire assembly is reciprocated by a cam 130, a camshaft 131 and connecting rod 132.

The inner slide 120 is of light weight construction and, as shown particularly in Figs. 15 and 16, comprises an annular body piece 133 of material such as beryllium or aluminum, an electrode 134 of silver plated copper alloy, and a plate 135 of a magnetic material. These parts are clamped together by means of a series of flat-headed screws 136 and appropriate spacers 137. A series of stabilizer bolts 138 bear upon a hardened insert 139 and cooperate with bearings 140 mounted in the outer slide bottom plate 129 to guide the lower end of the outer slide with respect to the inner slide. The bottom plate 129 is formed of a non-magnetic material, such as bronze, and serves to constrain the motion of the inner slide with respect to the outer slide both downward under the influence of the spring 141 and upward while under operational pressures and to stabilize the slide against the reactive magnetic forces set up by the slide conductors.

The spring 141 serves as a variable pressure element. The normal compression of the spring is adjustable by means of screws 142 which act upon a bearing ring 143. The action of the spring 141 must be exceedingly uniform around the circumference thereof to provide a stabilizing action and to this end the ends of the springs are ground to provide the necessary bearing surface while ground spacers 144 are provided for the precise adjustment of the bearing ring 143.

The body of the outer slide 118, including the shell 123 and a center post 145, is of magnetic material, and together with the slide plate 135 forms a magnetic circuit. The center portion 146 of the plate 135 is of cylindrical form with a spherical head and fits into a similarly shaped recess 147 in the center post 145 in order to obtain a maximum mechanical force. The gaps between the slide plate and the center post and shell may be in the order of .005 inch. The magnetic field is generated by an electric coil 148 which is wound in cylindrical form, properly insulated and shielded, and fitted about the center post 145. The coil is energized by a pressure-head magnetic control unit 149 which includes a source of electrical energy and suitable apparatus, preferably electronic, for controlling the flow of energy to the coil in response to suitable control impulses. These control impulses may be supplied by suitable connections 150 and 151 to a coupling device 152 connected to the welding transformer circuits so that the deenergization of the coil may be most consistently related to the welding current impulses. Alternatively (as shown in dotted outline), the control impulses may be supplied by the timer 28, a section 153 and connection 154 acting to energize the coil and a section 155 and connection 156 acting to deenergize the coil. Again, the timer 28 may be utilized to control the energizing of the coil and the impulse of welding current through the coupling device 152, utilized to control the deenergization thereof.

In operation, the timer switch 153 is adjusted with respect to crankshaft position so that, as the pressure device 118 starts the downward stroke, the coil is energized. The magnetic system is designed so as to exert a counter-pressure upon the spring of one-third to one-fifth of the spring pressure under compression, so that, as the electrode 134 engages the work piece, the spring cocking pressure is less than the normally exerted maximum by this amount. After the welding process has been initiated, the switch 155, which is properly adjusted with respect to crankshaft position, causes the deactivation of the coil 148. The deactivation may take place after the layer of fused metal is formed on the end-piece when "blow-out" may occur if the pressure is not increased rapidly. Where necessary, the magnetic field may be neutralized rapidly by a reverse current process.

It is to be understood that the circumferential line contact of the invention may be either a continuous contact about the circumference of the butt-piece or discontinuous segments or arcs. The apparatus of the invention is particularly useful where a small number of projections are formed at the end of the butt-piece, the end of each projection being formed for line contact, since a separate transformer-electrode combination may be utilized for positive control of the welding currents through each projection.

It is to be understood that the apparatus herein disclosed enables the practice of a welding method of unique capabilities. The practical result of the combination of a welding zone divergent from an initial line contact, a variable pressure process, and controlled welding current waveforms and amplitudes and the precise time correlation of these factors is such that the welding operation may be completed in an exceedingly short interval of time. As a consequence of such short time intervals, the effects of oxidation are essentially absent and it then becomes possible to weld such materials as the alloys of aluminum and magnesium and the high tensile strength steels in an efficient and practicable manner. Further, the high speed of action is such that the weld is completed before the heat energy has a chance to propagate to the parent metal surrounding the immediate weld zone, with a consequent preservation of the structure of that metal.

As an example of the practice of the invention, the following specifications were utilized in end welding one inch outside diameter 18 gauge tubing:

(1) Capacity of storage capacitor in supply: 3440 microfarads for steel; 1800 to 2100 microfarads for aluminum;

(2) Storage capacitor potential: 3000 volts for steel; 1700 to 2000 volts for aluminum;

(3) Transformer turns ratio: 168 to 1 for steel; 84 to 1 for aluminum;

(4) Speed of crankshaft: 250 R. P. M. for steel; 500 to 800 R. P. M. for aluminum;

(5) Circumferential line contact pressure—the pressure that forms the peripheral contact—with the pressure-head spring compressed to .015 inches between the coils: 3000 pounds for steel; 1500 pounds for aluminum;

(6) Follow-up pressure—the pressure that forms the desired width of plastic metal: 4000 pounds for steel; 2000 pounds for aluminum;

(7) Weight of the inner slide assembly of the pressure-head including the electrode and the current carrying assembly: 10 lbs. for steel; 3½ to 4 lbs. for aluminum;

(8) The time that the welded joint is allowed to remain in the clamping electrode—dependent upon electrode design which is different for the two materials: 10 seconds for steel; 2 seconds for aluminum;

(9) Spacing of inner and outer slides—value of X-distance at firing point: .040 inches;

(10) The time of rise to peak load: 1 to 4 milliseconds.

The foregoing description is necessarily of a detailed character, in order that the specific embodiment of the invention may be completely set forth. It is to be understood that the specific terminology is not intended to be restrictive or confining and that various rearrangements of parts and modifications of detail may be resorted to without departing from the scope or spirit of the invention as herein claimed.

I claim:

1. A welding apparatus comprising a clamping die and a movable die, the said dies being adapted to position work pieces for welding, means for actuating said movable die to apply an increasing pressure upon the pieces, a variable pressure device connected to the actuating means and supporting the movable die for exerting a follow-up pressure upon the pieces, a transformer for establishing an impulsive unidirectional welding current between said pieces, and a stored energy supply for energizing the primary of said transformer, electrical means for correlating the magnitude of the welding current between the pieces and the amount of pressure exerted upon the pieces by the variable pressure device, and a timer connected to said actuating means, and electrical connections between said timer and the said supply and between the timer and the said electrical means for positively controlling the said supply and the said electrical means at predetermined positions of said actuating means.

2. A welding apparatus comprising a multi-part clamping die and a movable die, the said dies being adapted to position work pieces, means for actuating said movable die to apply an increasing pressure to the work pieces comprising a drive shaft and cam means on said shaft, a variable pressure device connected to the said cam means and supporting the movable die for exerting a follow-up pressure upon the work pieces, a rotating timer operatively connected to said drive shaft, a plurality of transformers each having a secondary electrically connected to a part of said clamping die and to said movable die, a stored energy supply comprising a capacitor connected to the primaries of said transformers for supplying welding current to the pieces, and electrical connections between said timer and said energy supply for positively controlling the charge and discharge of said capacitor at predetermined positions of the said actuating means, electrical means for correlating the magnitude of the welding current between the pieces and the amount of pressure exerted upon the pieces by the variable pressure device, and an electrical connection between the said timer and the said correlating means for energizing and deenergizing the said correlating means at predetermined positions of the said actuating means.

3. A welding apparatus for electric resistance welding comprising a multi-part clamping die and a movable die, means for actuating said movable die, a variable pressure device interposed between the said actuating means and the said movable die, a timer operatively connected to said actuating means, a plurality of transformers each having a secondary electrically connected to said pressing die and a part of said clamping die, a stored energy supply comprising a capacitor and a gaseous discharge device, said discharge device, said capacitor and the primaries of said transformers being connected to form a series circuit, a control electrode in said discharge device, and electrical connections between said timer and said control electrode for energizing the said discharge device to discharge the capacitor into the primaries of the transformers at a predetermined position of the said actuating means.

4. In a welding apparatus for electric resistance welding, the combination of a multi-part clamping die and a movable die, means for actuating the movable die to apply an increasing pressure thereto, a reciprocable pressure device for exerting a follow-up pressure upon the pieces connected between the actuating means and the movable die, a plurality of transformers each having a secondary winding connected between the said movable die and a part of said clamping die, an impulsive energy supply connected in series with the primaries of said transformers, a plurality of gaseous discharge devices, each connected across the primary of one of said transformers, and a timer operatively connected to the die actuating means and electrically connected to the said energy supply and to each of the said discharge devices for controlling the action of said energy supply and said discharge devices at predetermined positions of the die actuating means.

5. A welding apparatus comprising a clamping die and a movable die, said dies being adapted to position work pieces for welding, means for actuating said movable dies to apply an increasing pressure to the work pieces, a variable pressure device connected to the actuating means and supporting the movable die for exerting a follow-up pressure upon the pieces, a transformer having a secondary winding connected to the said movable die and to the said clamping die, a stored energy supply connected to the primary of said transformer for applying welding current to the pieces, and means operatively controlled by said die actuating means and connected across the primary of said transformer for shunting the said primary at a predetermined position of the die actuating means.

6. A welding apparatus comprising a multi-part clamping die and a movable die, the said dies being adapted to position work pieces for welding, means for actuating said movable die to apply an increasing pressure to the work pieces, a variable pressure device connected to the actuating means and supporting the movable die for exerting a follow-up pressure upon the pieces, a plurality of transformers, each having a secondary winding connected to said movable die and a part of said clamping die, a stored energy supply connected to form a series circuit with the primaries of said transformers, and means operatively controlled by said die actuating means and connected across the primaries of said transformers for shunting the primaries at a predetermined position of the die actuating means.

7. A welding apparatus for electric resistance welding comprising a clamping die and a movable die, the said dies being adapted to position work pieces for welding, means for actuating said movable die including a cam for applying an increasing pressure to the work pieces, a variable pressure device having a spring disposed between the movable die and the cam for exerting a follow-up pressure upon the work pieces, a timer operatively connected to said die actuating means, a transformer having a secondary winding connected to said clamping die and said movable die, a stored energy supply comprising a capacitor connected to the primary of said transformer to supply an impulse of welding current to the work pieces upon each discharge of the capacitor, electrical valve means connected to the primary of said transformer, for shunting the primary of said transformer during the flow of the said impulse between the work pieces, and electrical connections between said timer, said electrical supply system, and said valve means for operatively controlling the said supply and the said discharge device at predetermined positions of the actuating means.

8. In a welding apparatus for electric resistance welding, the combination of a multi-part clamping die and a movable die, said dies being adapted to position work pieces for welding, means for actuating said movable die including a cam for applying an increasing pressure to the work pieces, a variable pressure device having a spring interposed between the movable die and the cam for applying a follow-up pressure to the pieces, a timer controlled by said die actuating means to rotate with the cam, a plurality of transformers each having a secondary winding electrically connected to said clamping die and to said movable die, an energy supply comprising a capacitor adapted to be discharged into the primary winding of said transformer, a gaseous discharge device connected in series with the capacitor and the primaries of said transformers, a control electrode in said discharge device, a plurality of gaseous discharge devices each connected in shunt with the primary of one of said transformers, a control electrode in each of said last-named discharge devices and electrical connections between said timer and said control electrodes for rendering the discharge devices conductive at predetermined positions of said cam.

9. A welding apparatus for electric resistance welding comprising a multi-part fixed die, a movable die, the said dies being adapted to position work pieces for welding, means for actuating said movable die, to apply an increasing pressure to the pieces, a variable pressure device connected to the actuating means and to the movable die for exerting a follow-up pressure upon the pieces, a rotating timer operatively connected to said die actuating means, a plurality of transformers each having a secondary winding electrically connected to said movable die and a part of said fixed die, an energy supply comprising a capacitor, a gaseous discharge device in serial connection with said energy supply and the primaries of said transformers, a control electrode in said discharge device, electrical connections between said timer and said control electrode, and means operatively controlled by said timer connected across the primaries of said transformers for controlling the rate of current decay in the secondaries of said transformers.

10. A welding apparatus for electric resistance welding comprising a multi-part fixed die, a movable die, the said dies being adapted to position work pieces for welding, means for actuating said movable die to apply an increasing pressure to the pieces, a variable pressure device connected to the actuating means and to the movable die for exerting a follow-up pressure upon the pieces, a rotating timer operatively connected to said die actuating means, a plurality of transformers each having a secondary winding electrically connected to said movable die and a part of said fixed die, an energy supply comprising a capacitor, a gaseous discharge device in serial connection with said energy supply and the primaries of said transformers, a control electrode in said discharge device, electrical connections between said timer and said control electrode, and a gaseous discharge device responsive to said timer connected in parallel with the primary of each of said transformers.

11. A welding apparatus comprising a multi-part clamping die and a movable die, die actuating means, a reciprocable pressure device with magnetic pressure control means, said pressure device being interposed between said movable die and said die actuating means and including a coil in said pressure-head, a control unit connected to said coil for energizing and deenergizing same, a plurality of transformers each having a secondary winding electrically connected between the said pressing die and a part of said clamping die, an impulsive energy supply serially connected with the primaries of said transformers and a timer operatively connected to said die actuating means, the said timer having a plurality of switch sections, some of the switches being electrically connected to said control unit and some of the switches being electrically connected to said energy supply.

12. A welding apparatus comprising a multi-part clamping die and a movable die, die actuating means, a reciprocable pressure-device with magnetic pressure control means, the said pressure device being interposed between said movable die and said die actuating means, a coil in said pressure-head, a control unit connected to said coil for energizing and deenergizing same, a plurality of transformers each having a secondary winding electrically connected between the said pressing die and a part of said clamping die, an impulsive energy supply serially connected with the primaries of said transformers, gaseous discharge devices shunt connected across the primaries of said transformers and a timer operatively connected to said die actuating means, the timer having a plurality of switch sections, some of the switches being electrically connected to said control unit, some of the switches being electrically connected to said energy supply, and some of the switches being electrically connected to said gaseous discharge devices for the sequential control thereof.

13. In a variable pressure device for electric resistance welders, an outer slide, an outer shell forming a part of said outer slide, an axially extending member within said shell, a coil around said axial member, an inner slide having an end portion thereof in magnetically cooperative relationship with said axial member and said shell, and a spring member mounted within said shell and bearing upon said outer slide and said inner slide.

14. A pressure-head for an electric resistance welder comprising an outer shell, a wall at one end of said shell, a center post extending from said end wall axially through a part of said shell, an inner slide having one end thereof formed as a plate extending across the interior of said shell and transversely of the axes thereof, said shell, said center post and the plate of said inner slide forming a magnetic circuit, a helical spring disposed along the interior of said shell and bearing upon said end wall and the plate of said inner slide, and a coil surrounding said inner post, said coil serving to energize the magnetic circuit and exert a compressive force upon the spring.

15. In a welding apparatus for electric resistance welding, the combination of a clamping die and a movable die, said dies being adapted to position work pieces for welding, means for actuating said movable die to apply an increasing pressure to the die, a variable pressure device connected to the actuating means and to the movable die for applying a follow-up pressure upon the work pieces, electromagnetic means for pressure control incorporated in said variable pressure device, and means for energizing and deenergizing said electromagnetic means at predetermined positions of the actuating means.

16. In a welding apparatus for electrical resistance welding, the combination of a clamping die and a movable die, said dies being adapted to position work pieces for welding, means for actuating said movable die to apply an increasing pressure to the work pieces, a variable pressure device operatively connected to the actuating means and supporting the movable die for exerting a follow-up pressure upon the pieces, electromagnetic means for pressure control incorporated in said pressure device, a transformer having a secondary winding electrically connected to the said movable die and to said clamping die, and a primary adapted to be connected to a stored energy supply and control means for said electromagnetic means electrically connected to said transformers whereby the action of said electromagnetic means may be related to the flow of energy from said supply.

17. In a welding apparatus for electric resistance welding, the combination of a clamping die and a movable die, the said dies being adapted to position work pieces for welding, means for actuating said movable die to exert an increasing pressure upon the work pieces, a variable pressure device operatively connected to the actuating means and supporting the movable die and including a compressed spring for applying a follow-up pressure to the work pieces, and electromagnetic means for pressure control incorporated in said pressure device, means for the supply of impulsive welding currents to said dies and controlled by said die actuating means, control means for said electromagnetic means, and electrical connections between said supply means and said control means to increase the follow-up pressure at a predetermined interval after initiation of flow of welding current from said supply means.

18. In a welding apparatus for electric resistance surface welding, the combination of a clamping die and a movable die, said dies being adapted to position work pieces for welding, actuating means for applying an increasing pressure to said movable die, a reciprocable pressure device operatively connected to the actuating means and supporting the movable die and including a compressed spring for exerting a follow-up pressure upon the work pieces, and a solenoid coil for ancillary electromagnetic pressure control incorporated in said pressure device for applying an offsetting pressure to the compressed spring to produce an increase in follow-up pressure upon deenergization thereof, means for the supply of impulsive welding currents connected to said die, and a rotating timer operatively connected to said die actuating means, and electrical connections from the said timer to said welding current supply for initiating the flow of welding currents and to said coil for deenergizing the coil at a predetermined position of the actuating means.

19. In a welding apparatus for electric resistance welding, the combination of a clamping die and a movable die, the said dies being adapted to position work pieces for welding, actuating means for applying an increasing pressure to said movable die, a reciprocable pressure device for exerting a follow-up pressure and having a solenoid coil for ancillary magnetic pressure control, the said coil being adapted to produce an increase in follow-up pressure upon deenergization thereof, a control unit connected to the coil of said pressure device and a timer operatively connected to said die actuating means, said timer being electrically connected to said control unit for energizing and deenergizing the coil at predetermined positions of the actuating means.

20. A welding apparatus comprising a clamping die and a movable die, the said dies being adapted to position work pieces for welding, means to move said movable die toward said clamping die and thereby to move the work pieces toward each other, variable pressure means for varying the pressure applied by said moving means to said work pieces, said variable means including two relatively movable members, a spring compressed between said movable members and compressible by said die moving means and a solenoid coil adapted when energized to offset in part the pressure exerted by said moving means, and a timer arranged to deenergize said solenoid at a predetermined time during the application of pressure and current to said work pieces and thereby produce a sharp increase in the pressure upon the pieces.

21. In an electric resistance welder, in combination, a clamping die adapted to hold a first work piece and comprising at least two parts for conducting separate welding currents to the piece, a movable die adapted to hold a second work piece in engagement with the first piece, drive means for said movable die comprising a shaft and a cam for applying an increasing pressure to the work pieces, a pressure device for maintaining pressure upon the work pieces after initial fusion of the adjoining portions thereof, the said pressure device including two relatively movable slide members, one of the said members serving to support the movable die and the remaining member being operatively connected to the drive means, a spring compressed between the two members, and a solenoid for modifying the pressure delivered by the spring the said solenoid including a coil adapted to be energized from a source of electrical energy to apply a compressive force to the spring before a substantial pressure is exerted upon the work pieces by the movable die, and timer means actuated by the said drive means, said timer means including a switch electrically connected to the said coil for deenergizing said coil at a predetermined interval after initial fusion to release the spring and thereby produce an additional pressure upon the work pieces.

22. In an electric resistance welder, in combination, a clamping die adapted to hold a first work piece and comprising at least two parts for separately conducting welding current to the piece, a movable die adapted to hold a second work piece in engagement with the first work piece, at least one of the work pieces having a curved cross section at the extremity thereof so that the quantity of metal to be fused increases from an initial line contact, means for actuating said movable die comprising a shaft and a cam for applying an increasing pressure to the work pieces and a variable pressure device for applying a line contact pressure and then a follow-up pressure to the pieces, the said pressure device including two relatively movable slide members and a coil, the said members and the said coil comprising a solenoid, and a spring compressed between the slide members, rotation of the cam serving to compress the spring upon engagement of the dies and the work pieces and the coil being adapted to be energized to apply a compressive force to the spring for modifying the pressure exerted by the spring, means connected to said dies for passing an impulse of welding current through the said work pieces, the impulse being such that the current increases rapidly from an initial low value, the initial increase of welding current serving to start the generation of high heat during flow through the initial line contact between the pieces, and a timer connected to the said shaft for rotation therewith, the said timer including a switch electrically connected to the said solenoid coil for deenergizing the coil to produce an additional pressure upon the pieces after the area of fused metal between the pieces and the welding current has increased substantially and prior to application of metal setting and forging pressures by the cam.

23. In an electric resistance welder, in combination, a clamping die adapted to hold a first work piece and comprising at least two parts for conducting separate currents to the piece, a movable die adapted to hold a second work piece in engagement with the first piece, at least one of the work pieces having a curved cross section at the extremity thereof so that the quantity of metal to be fused first increases rapidly from an initial line contact between the pieces and then increases less rapidly, drive means for actuating said movable die comprising a shaft and a cam for applying an increasing pressure to the work pieces, a pressure device operatively connected to the cam and supporting the movable die for applying a low pressure upon the pieces upon line contact and then applying a follow-up pressure, the said device including two relatively movable slide members and a spring compressed between the members, a coil, the said slides and the said coil comprising a solenoid for applying a compressive force to the spring to modify the pressure produced by the spring, a transformer having a secondary thereof connected to a part of the movable die and to the clamping die, and the primary thereof being adapted to be connected to a stored energy supply for producing a welding current having a predetermined rate of increase in the secondary of the transformer and through the work pieces, the initial increase of welding current serving to start the generation of high heat during flow through the initial line contact between the pieces, and a timer connected to the said shaft for rotation therewith, the said timer including a switch electrically connected to the solenoid to release the spring at a predetermined time after the initiation of flow of welding current to produce a substantially instantaneous pressure upon the pieces in addition to that exerted by the cam.

24. In an electric resistance welder, in combination, a clamping die, a movable die, said dies being adapted to receive and hold work pieces in engagement for welding, the clamping die comprising at least two parts, each part being adapted to be connected to the secondary of a separate welding transformer, a pressure device for exerting a controlled pressure increasing from a low pressure to a higher pressure upon the said pieces, the said pressure device including an inner slide supporting the said movable die, an outer slide, a spring compressed between the said slides and adapted to be further compressed by the inner slide upon engagement of the movable die with the work pieces, and means for applying a compressive force to the spring independently of the engagement of the movable die with the work pieces, drive means for reciprocating said pressure device including a cam for applying a metal setting pressure and a forging pressure to the work pieces through the pressure device, means connected to said dies for passing an impulse of welding current through the said work pieces, the impulse being such that the current increases rapidly from an initial low value, and means actuated by the said drive means for releasing the said spring compressing means to produce a substantially instantaneous additional pressure upon the work pieces after the welding current has increased substantially, the said welder being particularly adapted to produce surface welds between two work pieces in which at least one of the pieces is contoured so as to produce a welding zone in which the quantity of metal to be fused increases from a line contact and the electrical resistance between the pieces decreases therewith in accordance with the increase of the current and the increase from the lower pressure to the higher pressure exerted upon the pieces.

25. In an electric resistance welder, in combination, a clamping die adapted to hold a first work piece and comprising at least two parts adapted to contact the pieces for conducting welding current to the pieces along separate paths, a movable die adapted to hold a second work piece in engagement with the first work piece, at least one of the pieces being contoured at the extremity thereof so as to form a welding zone in which the quantity of metal to be fused increases from an initial contact between the pieces according to the required decrease in electrical resistance, a pressure device for exerting controlled pressure increasing from a line contact pressure to a higher pressure upon the said pieces, the said pressure device including two relatively movable slide members, one of the said members serving to support the said movable die, a spring between the members adapted to be compressed upon engagement of the movable die with the work pieces, and a solenoid for applying a compressive force to the spring independently of the engagement of the movable die with the work pieces, the solenoid including a coil and the said slides forming a path for the flow of magnetic currents, drive means for reciprocating said pressure device including a cam for applying a metal setting pressure and a forging pressure to the work pieces through the pressure device, means comprising at least two transformers, each having the secondary thereof connected to a part of the clamping die and to the movable die and the primary thereof being adapted to be connected to a capacitor at a predetermined position of the cam for passing an impulse of welding current through the work pieces, the said impulse being such that the current increases rapidly from an initial low value associated with a high resistance between the pieces upon the line contact therebetween, the said pressure device including means for limiting the relative motion between the slide members during initial flow of welding current, and a timer connected to the said shaft for rotation therewith and including a switch electrically connected to the solenoid coil adapted to be opened to deenergize the said solenoid for applying an additional pressure upon substantial decrease of the resistance between the pieces and upon substantial increase of the current.

26. In an electric resistance welder, in combination, a clamping die comprising two or more segments adapted to hold a first work piece and conduct currents to the piece through each segment, a movable die adapted to hold a second work piece in engagement with the first piece, at least one of the work pieces having a curved cross section at the extremity thereof so that the quantity of metal to be fused increases from an initial line contact between the pieces according to the required change in electrical resistance, a pressure device for exerting a controlled pressure upon the said movable die, the said pressure device including two relatively movable slide members, one of the said members serving to support the said movable die and being of relatively light weight to minimize the inertia thereof, a spring adapted to be compressed by the said members upon engagement of the movable die with the said work pieces, and a solenoid for applying compressive pressure to the said spring, the solenoid including a coil adapted to be connected to a circuit for energizing the said solenoid, drive means for reciprocating said pressure device and exerting a pressure increasing from a low initial line contact pressure upon the pieces comprising a cam and a shaft therefor, a plurality of welding transformers, each transformer having a secondary thereof connected to the said movable die and one segment of the clamping die and the primaries of the said transformers being adapted to be connected in a series circuit with a capacitor and electrical valve means for controlling the discharge of the capacitor into the said primaries, the said capacitor and transformers being adapted to produce a welding current between the work pieces having an initial rapid rise upon excitation of the valve means associated with a high resistance between the pieces upon line contact therebetween, and a timer connected to the said shaft for rotation therewith, the said timer including a switch adapted to be connected to the said valve means for initiating a flow of welding current about the time of initial line contact between the work pieces, and a switch adapted to be connected to the solenoid circuit for deenergizing the said solenoid to apply a substantially instantaneous additional pressure to the pieces upon substantial decrease of the resistance between the pieces and after the welding current has increased substantially.

27. In an electric resistance welder, in combination, a clamping die comprising two or more segments adapted to hold a first work piece and pass separate welding currents through the piece, a movable die adapted to hold a second work piece in engagement with the first piece, at least one of the work pieces having a curved cross section at the extremity thereof so that the quantity of metal to be fused increases rapidly from an initial line contact between the pieces, a pressure device for exerting a controlled pressure upon the said movable die, the said pressure device including two relatively movable members, one of the said members serving to support the said movable die and being of relatively light weight to minimize the inertia thereof, a spring adapted to be compressed by the said members upon engagement of the movable die with the said work pieces, and a solenoid for applying compressive pressure to the said spring, the solenoid including a coil adapted to be connected to a circuit for energizing the said solenoid, drive means for reciprocating said pressure device and exerting a pressure increasing from a low initial line contact pressure upon the pieces comprising a cam and a shaft therefor, a plurality of welding transformers, each transformer having a secondary thereof connected to the said movable die and one segment of the clamping die and the primaries of the said transformers being adapted to be connected in a series circuit with a capacitor and electrical valve means for controlling the discharge of the capacitor into the said primaries, the said capacitor and transformers being adapted to produce a welding current between the work pieces having an initial high rate of rise upon excitation of the valve means, and a timer connected to the said shaft for rotation therewith, the said timer including a switch adapted to be connected to the said valve means for initiating a flow of welding current about the time of initial line contact between the work pieces, a switch adapted to be connected to the solenoid circuit for deenergizing the said solenoid to produce a substantially instantaneous additional pressure after the welding current has increased substantially to prevent the formation of an arc between the pieces, and a switch adapted to be connected to an electric valve means in the primary circuit of the transformers for reducing the welding current rapidly at a predetermined interval after the application of additional pressure.

28. In a welding device, in combination, a clamping die adapted to hold a first work piece and comprising at least two parts for conducting separate currents to the piece, a movable die adapted to position a second work piece against the first piece, a pressure device having two relatively movable members including a low inertia inner member supporting the movable die, an outer member supporting and constraining the inner member and a spring compressed between the two members, drive means for reciprocating the said pressure device including a drive shaft and cam means connected to the outer member for guiding the pressure device toward and away from the clamping die during the reciprocation thereof, means for passing separate welding impulses between the work pieces including separate transformers, each having the secondary thereof connected to the movable die, a stored energy supply comprising a capacitor connected in series with the primaries of the several transformers, electrical means for correlating the flow of welding current between the pieces and the pressure upon the pieces, and a timer operatively connected to the drive shaft and having separate switches connected to the energy supply and to the correlating means for separately controlling the energy supply and correlating means and cam means for separately operating the said switches at predetermined positions of the drive shaft.

29. In a welding device, in combination, a clamping die adapted to hold a first work piece and comprising at least two parts for conducting separate currents to the piece, a movable die adapted to position a second work piece against the first piece, a pressure device having two relatively movable members including a low inertia inner member supporting the movable die, an outer member supporting and constraining the inner member and a spring compressed between the two members, drive means for reciprocating the said pressure device including a drive shaft and cam means connected to the outer member, and means associated with the outer member for guiding the pressure device toward and away from the clamping die during the reciprocation thereof, means for applying an offset pressure to the compressed spring including a solenoid coil in the pressure device and a control circuit for energizing and deenergizing the coil, means for passing separate welding impulses between the work pieces including separate transformers, each having the secondary thereof connected to a part of the clamping die and to the movable die, and a stored energy supply connected to the primaries of the transformers, means shunted across the primary of each of the transformers for separately controlling the currents in the primaries of the transformers, and means operatively actuated by the said drive means for separately controlling the operation of the said solenoid control circuit, stored energy supply and shunt means at predetermined positions of the drive means.

30. In a welding device, in combination, a clamping die adapted to hold a first work piece and comprising at least two parts for conducting separate currents to the piece, a movable die adapted to position a second work piece against the first piece, a pressure device having two relatively movable members including a low inertia inner member supporting the movable die, an outer member supporting and constraining the inner member and a spring compressed between the two members, drive means for reciprocating the said pressure device including a drive shaft and cam means connected to the outer member, and means associated with the outer member for guiding the pressure device toward and away from the clamping die during the reciprocation thereof, means for applying an offset pressure to the compressed spring including a solenoid coil in the pressure device and a control circuit for energizing and deenergizing the coil, means for passing separate welding impulses between the work pieces including separate transformers each having the secondary thereof connected to a part of the clamping die and to the movable die, and a stored energy supply connected to the primaries of the transformers, means shunted across the primary of each of the transformers for separately controlling the currents in the primaries of the transformers, and a timer operatively connected to the drive shaft and having a switch connected to the solenoid control circuit and separate switches connected to the energy supply, the said shunt devices and the solenoid control circuit, respectively, and cam means for separately operating the said switches at predetermined positions of the drive shaft.

31. In a welding device, in combination, a clamping die adapted to hold a first work piece and comprising at least two parts for conducting separate currents to the piece, a movable die adapted to position a second work piece against the first piece, a pressure device having two relatively movable members including a low inertia inner member supporting the movable die, an outer member supporting and constraining the inner member and a spring compressed between the two members, drive means for reciprocating the said pressure device including a drive shaft and cam means connected to the outer member, and means associated with the outer member for guiding the pressure device toward and away from the clamping die during the reciprocation thereof, means for applying an offset pressure to the compressed spring including a solenoid coil in the pressure device and a control circuit for energizing and deenergizing the coil, a plurality of welding transformers, each associated with one part of the clamping die and having the secondary thereof connected to the part and to the movable die, a stored energy supply comprising a capacitor connected in series with the primaries of the several transformers, and means for discharging the capacitor into the said primaries, a discharge device shunted across the primary of each of the transformers, and a timer operatively connected to the drive shaft and having separate switches connected to the said solenoid control circuit, energy supply and shunt devices, respectively, and cam means for separately operating the said switches at predetermined positions of the drive shaft.

32. In a welding device, in combination, a clamping die adapted to hold a first work piece and comprising at least two parts for conducting separate currents to the piece, a movable die adapted to position a second work piece against the first piece, a pressure device having two relatively movable members including a low inertia inner member supporting the movable die, an outer member supporting and constraining the inner member and a spring compressed between the two members, drive means for reciprocating the said pressure device including a drive shaft and cam means connected to the outer member, and means associated with the outer member for guiding the pressure device toward and away from the clamping die during the reciprocation thereof, means for applying an offset pressure to the compressed spring including a solenoid coil in the pressure head and a control circuit for energizing and deenergizing the coil, a welding transformer having the secondary thereof connected to the movable die and to a part of the clamping die, a stored energy supply comprising a capacitor and a discharge device connected in series with the primary of the said transformer and the capacitor, a second discharge device shunted across the primary of said transformer for controlling the current in the said primary, and a timer operatively connected to the drive shaft and including separate switches electrically connected to the said solenoid control circuit, the series discharge device, and the said shunt discharge device, respectively, and cam means for separately operating the said switches at predetermined positions of the drive shaft.

33. A variable pressure device for electric welders comprising, in combination, an outer slide comprising a generally cylindrical outer member closed at one end thereof and a center piece extending longitudinally through the outer member from the closed end to define an elongated annular space, an end plate secured to the outer member at the open end thereof and having a central opening aligned with the center piece, an inner slide including an annular member adapted to project through the opening in the end plate, and an inner slide plate secured to the annular piece and spaced from the end of the center piece, a helical spring disposed in the annular space and compressed between the outer shell at the one end thereof and the inner slide plate at the remaining end thereof to force the inner slide plate against the end plate, and a solenoid coil surrounding the said center piece and adapted to be energized to exert a force upon the inner slide plate tending to offset the pressure applied by the spring.

34. The invention in accordance with claim 33, the said inner slide member being formed of light weight material so as to minimize the inertia thereof and permit a very high speed follow-up upon deenergization of the solenoid.

References Cited in the file of this patent

UNITED STATES PATENTS

| | | |
|---|---|---|
| 1,031,026 | Presser | July 2, 1912 |
| 1,534,070 | MacFarland | Apr. 21, 1925 |
| 1,832,497 | Murray | Nov. 17, 1931 |
| 1,825,236 | Miller | Dec. 8, 1931 |
| 1,996,226 | Allan et al. | Apr. 2, 1935 |
| 2,085,049 | Spire | June 29, 1937 |
| 2,091,982 | Hart | Sept. 7, 1937 |
| 2,145,276 | Pfanstiehl | Jan. 31, 1939 |
| 2,183,563 | Hart | Dec. 19, 1939 |
| 2,214,856 | Jahde | Sept. 17, 1940 |
| 2,243,488 | Rehse | May 27, 1941 |
| 2,254,494 | Rabezzana | Sept. 2, 1941 |
| 2,287,540 | Vang | June 23, 1942 |
| 2,340,694 | Rogers | Feb. 1, 1944 |
| 2,377,328 | Dawson | June 5, 1945 |
| 2,417,075 | Hart | Mar. 11, 1947 |
| 2,425,470 | Hait | Aug. 12, 1947 |
| 2,455,057 | Hart | Nov. 30, 1948 |
| 2,583,455 | Wilson | Jan. 22, 1952 |